March 16, 1954
R. GILMONT ET AL
2,672,315
UNIVERSAL PRESSURE-TIGHT STOPCOCK ADAPTER
Filed July 2, 1951
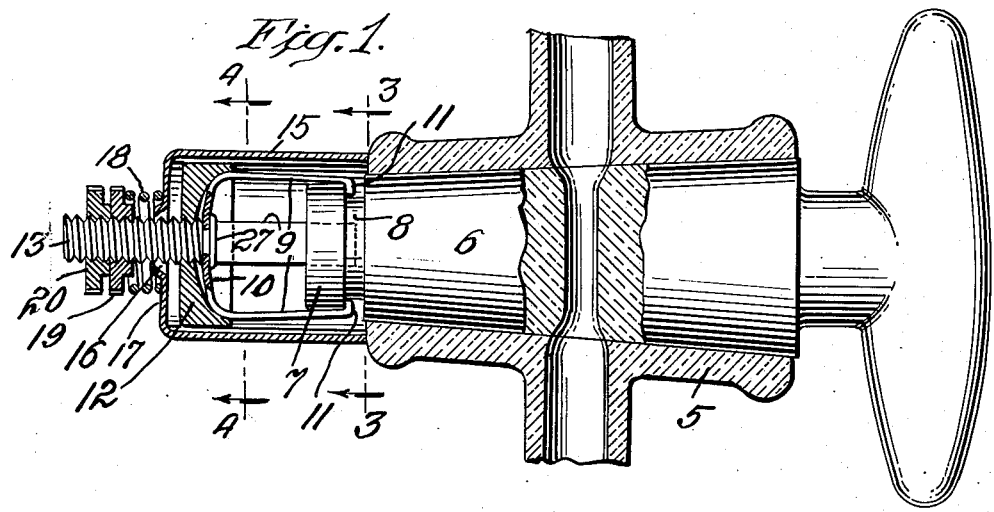
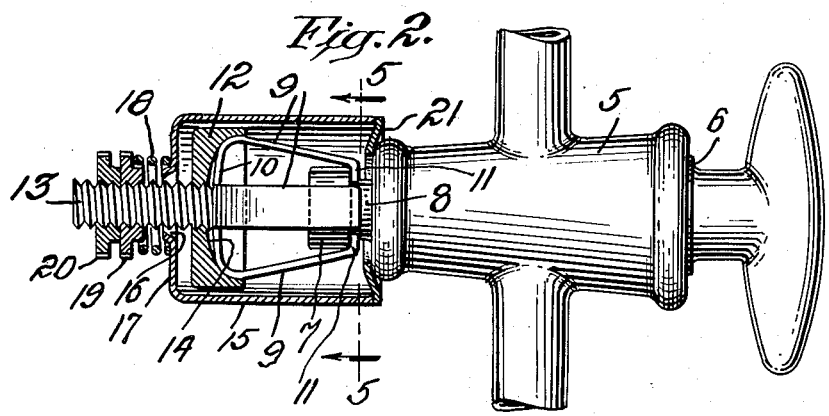
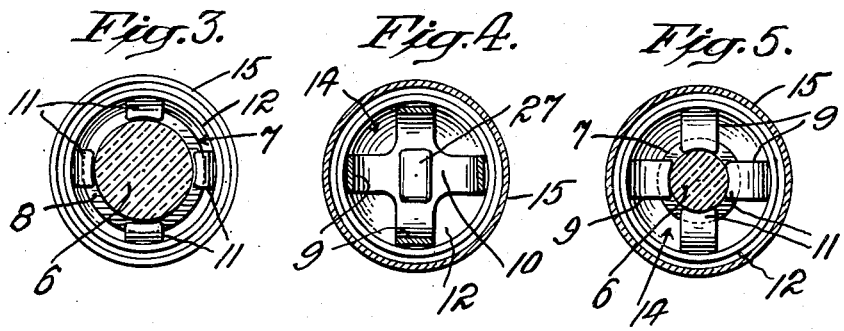
INVENTORS
ROGER GILMONT
ROBERT HOUSTON HAMILTON
BY
*Philip S. Morgan*
ATTORNEY Patented Mar. 16, 1954

2,672,315

UNITED STATES PATENT OFFICE 2,672,315

UNIVERSAL PRESSURE-TIGHT STOPCOCK ADAPTER

Roger Gilmont, Brooklyn, N. Y., and Robert H. Hamilton, Philadelphia, Pa., assignors to The Emil Greiner Company, New York, N. Y., a corporation of New York Application July 2, 1951, Serial No. 234,722

2 Claims. (Cl. 251—112)

1

The invention disclosed in this patent relates to devices for converting ordinary laboratory stopcocks to pressure-tight stopcocks, as covered in copending patent application of Bertram M. Stone and Roger Gilmont, Serial No. 65,355, filed December 15, 1948, Patent No. 2,642,258.

These laboratory stopcocks are usually of glass, consisting simply of a tapered valve plug rotatably seated in a tapered valve body and secured in this relation by a washer engaged in a groove in a portion of the plug extending beyond the end of the valve body.

The adapter for converting the stopcock to pressure-tight and vacuum-tight operation comprises a clutch element having jaw portions engageable in the groove of the valve plug, together with an abutment sleeve or thimble engageable with the end of the valve body and a valve seating spring adjustably tensioned by a screw connection between the clutch and abutment forming elements.

The objects of the present invention generally are to provide an adapter of the type indicated which will be universally adaptable to stopcocks of different sizes and in which the advantages of such a construction will be attained without adding appreciably to the size, complexity or cost of the article.

Other desirable objects attained by the invention and the novel features through which the purposes of the invention are attained are set forth or will appear in the course of the following specification.

The drawing accompanying and forming part of the specification illustrates a present practical embodiment of the invention. Structure, however, may be modified and changed as regards this illustration, all within the true intent and broad scope of the invention as hereinafter defined and claimed.

Fig. 1 in the drawing is a broken perspective view of an ordinary glass stopcock having one of the new universal adapters applied thereto;

Fig. 2 is a similar view showing the same adapter applied to a stopcock of smaller size;

Figs. 3, 4 and 5 are cross sectional views on substantially the planes of lines 3—3, 4—4 and 5—5 of Figs. 1 and 2.

The stopcocks shown are of conventional design, embodying a tapered valve body or shell 5 and a tapered valve plug 6.

The latter, as usual in these devices, has a portion 7 at the smaller end of the same projecting beyond the end of the valve body and provided with an annular groove 8. This groove in the

2 exposed end portion of the valve plug affords an annular shoulder for engagement of a clutch collar for drawing the valve plug into seated engagement in the valve body.

The clutch collar element is shown in the form of a spring yoke having side arms 9 connected by a back portion 10 and provided at their free ends with angularly inturned, segmental jaws 11 engageable in the groove 8 in the plug.

Means are provided for drawing and holding the jaws together in firmly or fully engaged relation with the shoulder of the valve plug, said means consisting in the illustration of a thumb nut 12 engaged on the screw stem 13 and hollowed or concaved at 14 to accommodate and to effect a contracting engagement over the back or yoke portion 10 of the clutch fingers.

The springy character of the clutch yoke permits of the nut 12 being tightened to any extent required to force the jaws 11 together into clutching engagement with valve plugs of a considerable range of sizes.

The sleeve or thimble through which the end seating pull on the plug is transmitted to the valve body is indicated at 15, of a size to enclose the clutch member and of a diameter at its open end to abut the end of what may be considered the largest size stopcock the adapter is intended to be used with, the relation indicated in Fig. 1.

The outer end of the abutment sleeve is closed except for an opening 16 to freely pass the screw stem 13 extending from the back of the yoke.

This closed end wall 17 of the sleeve forms the seat or abutment for the coiled spring 18 which loosely surrounds the screw and bears at the outer end against adjusting nut 19 which is fixed by lock nut 20.

Fig. 2 shows how the clutch may be adjusted to a smaller size stopcock by tightening the screw 12, to contract the clutch jaws closer together, and this same view shows how, when the end of the valve body 5 is smaller than the open end of the abutment or thrust sleeve 14, a filler washer 21 of dished, self-centering formation, may be interposed between the end of the valve body and the end of the sleeve.

Thus the adjustability of the clutch yoke enables this member to be quickly and easily adapted to valve plugs of different sizes, and the use or non-use of the washers 21 permits the thrust sleeve being used with smaller or larger size valve bodies.

In use with different size stopcocks the invention performs its desired service of firmly and positively holding the valve plug closely seated in non-leaking, pressure-tight and vacuum-tight engagement in the valve body. The device is small and compact and consists of few and inexpensive parts.

In the present illustration the gripping fingers are shown as four in number, but the number of these fingers may be greater or less than this. The connecting yoke portion of these spring fingers may be riveted or otherwise secured to the inner end of the screw stem, as indicated at 27.

The screw means indicated at 12 provides for contracting and holding the arms of the clutch yoke adjustably and firmly gripped to the end of the valve plug so that as much spring tension may be applied as required to hold the valve plug firmly seated in leak-proof engagement in the valve body.

What is claimed is:

1. Universal pressure-tight stopcock adapter for a stopcock having a tapered valve plug turning in a tapered valve body and provided with a shouldered end extension projecting at the smaller end of the valve body, said adapter comprising a clutch yoke having side arms relatively adjustable toward and away from each other and provided at the free ends of the same with opposed inwardly angled jaws interlockingly engageable with said shouldered end extension of the valve plug, means engageable with said side arms of the yoke for forcing the same positively together to an adjustable extent and for holding said jaws in gripping engagement with said shouldered valve plug extension, an abutment sleeve about said clutch yoke for exerting thrust against the end of the valve body, a screw extending from the outer end of said clutch yoke through the outer end of said abutment sleeve, a tension spring interposed between said sleeve and that portion of the screw projecting through the outer end of the sleeve, and a dished, self-centering washer interposed between the end of the valve body and the end of said abutment sleeve.

2. Universal pressure-tight stopcock adapter for a stopcock having a tapered valve plug turning in a tapered valve body and provided with a shouldered end extension projecting at the smaller end of the valve body, said adapter comprising a clutch yoke having side arms relatively adjustable toward and away from each other and provided at the free ends of the same with inwardly angled jaws interlockingly engageable with said shouldered end extension of the valve plug, an abutment sleeve about said clutch yoke for exercising thrust against that end of the valve body from which said shouldered end portion of the plug projects, an adjustable screw connection between said clutch yoke and the outer end of said abutment sleeve arranged to force said sleeve into thrust applying engagement with said end of the valve body and including a screw extending freely through the outer end of said thrust sleeve, said clutch yoke being secured to the inner end of said screw at the inside of said sleeve and said thrust applying means further including a nut engaged on said screw at the outside of said sleeve and a spring interposed between said nut and the outer end of the sleeve and, said means for setting and holding the jaws in gripping engagement with the valve plug including a nut engaged on the screw at the inside of the sleeve and a cavital portion shifted by said nut in its adjustment on the screw and engaging over the end of the yoke for applying contracting pressure to the yoke as said nut is adjusted inwardly on said screw.

ROGER GILMONT.
ROBERT H. HAMILTON.

References Cited in the file of this patent

UNITED STATES PATENTS

| Number | Name | Date |
| --- | --- | --- |
| 1,083,416 | Sorenson | Jan. 6, 1914 |
| 1,243,860 | Olson | Oct. 23, 1917 |
| 1,323,432 | Zandecki | Dec. 2, 1919 |
| 1,407,878 | Moyer | Feb. 28, 1922 |
| 2,058,748 | Wilkens | Oct. 27, 1936 |
| 2,412,597 | Brewer | Dec. 17, 1946 |

FOREIGN PATENTS

| Number | Country | Date |
| --- | --- | --- |
| 194,642 | Germany | Feb. 7, 1907 |